United States Patent
Hundemer

(10) Patent No.: US 9,966,110 B2
(45) Date of Patent: May 8, 2018

(54) VIDEO-PRODUCTION SYSTEM WITH DVE FEATURE

(71) Applicant: Tribune Broadcasting Company, LLC, Chicago, IL (US)

(72) Inventor: Hank J. Hundemer, Bellevue, KY (US)

(73) Assignee: Tribune Broadcasting Company, LLC, Chicago, IL (US)

( * ) Notice: Subject to any disclaimer, the term of this patent is extended or adjusted under 35 U.S.C. 154(b) by 0 days. days.

(21) Appl. No.: 15/295,754

(22) Filed: Oct. 17, 2016

(65) Prior Publication Data

US 2017/0111688 A1    Apr. 20, 2017

Related U.S. Application Data

(60) Provisional application No. 62/242,593, filed on Oct. 16, 2015.

(51) Int. Cl.
*H04N 7/173* (2011.01)
*G11B 27/031* (2006.01)
(Continued)

(52) U.S. Cl.
CPC ............ *G11B 27/031* (2013.01); *G11B 27/19* (2013.01); *H04L 65/4076* (2013.01);
(Continued)

(58) Field of Classification Search
None
See application file for complete search history.

(56) References Cited

U.S. PATENT DOCUMENTS

RE41,968 E * 11/2010 Washino .................. G06F 3/14
348/722
2012/0210216 A1    8/2012 Hurst
(Continued)

FOREIGN PATENT DOCUMENTS

JP         2015128206 A     7/2015

OTHER PUBLICATIONS

International Search Report dated Jan. 16, 2017 issued in connection with International Application No. PCT/US2016/057380, filed on Oct. 17, 2016, 3 pages.
(Continued)

*Primary Examiner* — Kieu Oanh T Bui
(74) *Attorney, Agent, or Firm* — McDonnell Boehnen Hulbert & Berghoff LLP

(57) ABSTRACT

In one aspect, an example method includes (i) receiving, by a computing system, a first command; (ii) responsive to receiving the first command, executing, by the computing system, a first portion of a digital-video effect (DVE) by sequentially performing a first subset of ordered steps, wherein executing the first portion of the DVE causes the computing system to generate a first portion of video content at a first frame rate; (iii) receiving, by the computing system, a second command that is different from the first command; and (iv) responsive to receiving the second command, executing, by the computing system, a second portion of the DVE by sequentially performing a second subset of ordered steps, wherein executing the second portion of the DVE causes the computing system to generate a second portion of the video content at a second frame rate that is different than the first frame rate.

20 Claims, 7 Drawing Sheets

(51) Int. Cl.
| | |
|---|---|
| *G11B 27/19* | (2006.01) |
| *H04N 21/84* | (2011.01) |
| *H04N 21/845* | (2011.01) |
| *H04N 21/854* | (2011.01) |
| *H04N 21/262* | (2011.01) |
| *H04N 21/81* | (2011.01) |
| *H04L 29/06* | (2006.01) |
| *H04N 21/44* | (2011.01) |
| *H04N 21/4627* | (2011.01) |
| *H04N 21/472* | (2011.01) |
| *H04N 21/6587* | (2011.01) |

(52) U.S. Cl.
CPC .......... *H04L 65/602* (2013.01); *H04L 65/605* (2013.01); *H04L 65/607* (2013.01); *H04N 21/262* (2013.01); *H04N 21/44* (2013.01); *H04N 21/4627* (2013.01); *H04N 21/472* (2013.01); *H04N 21/6587* (2013.01); *H04N 21/8126* (2013.01); *H04N 21/84* (2013.01); *H04N 21/8456* (2013.01); *H04N 21/854* (2013.01)

(56) References Cited

U.S. PATENT DOCUMENTS

| | | |
|---|---|---|
| 2012/0331496 A1 | 12/2012 | Copertino et al. |
| 2015/0237415 A1 | 8/2015 | Hundemer |
| 2015/0264295 A1 | 9/2015 | Hundemer |

OTHER PUBLICATIONS

Written Opinion of the International Searching Authority dated Jan. 16, 2017 issued in connection with International Application No. PCT/US2016/057380, filed on Oct. 17, 2016, 7 pages.

\* cited by examiner

| Story Title | Video Content Item Identifier | Duration |
| --- | --- | --- |
| STORY A | VCI ID A | 00:02:00:00 |
| STORY B | VCI ID B | 00:01:30:00 |
| STORY C | | 00:00:30:00 |
| STORY D | VCI ID D | 00:00:30:00 |
| STORY E | VCI ID E | 00:00:30:00 |
| COMMERCIAL BREAK | | |
| STORY F | VCI ID F | 00:02:00:00 |
| STORY G | | 00:01:30:00 |
| STORY H | VCI ID H | 00:00:30:00 |
| STORY I | VCI ID I | 00:00:30:00 |

VIDEO-PRODUCTION SYSTEM WITH DVE FEATURE

RELATED DISCLOSURES

This disclosure claims priority to U.S. Provisional Patent Application No. 62/242,593, titled "Video Production System with Content-Related Features," filed on Oct. 16, 2015, which is hereby incorporated by reference in its entirety.

USAGE AND TERMINOLOGY

In this disclosure, unless otherwise specified and/or unless the particular context clearly dictates otherwise, the terms "a" or "an" mean at least one, and the term "the" means the at least one.

SUMMARY

In one aspect, an example method is disclosed. The method is for use in connection with a computing system configured to execute a digital-video effect (DVE) by sequentially performing a set of ordered steps, wherein executing the DVE causes the computing system to generate video content, wherein the set of ordered steps comprises a first subset of ordered steps followed by a second subset of ordered steps. The method includes (i) receiving, by the computing system, a first command; (ii) responsive to receiving the first command, executing, by the computing system, the first portion of the DVE by sequentially performing the first subset of ordered steps, wherein executing the first portion of the DVE causes the computing system to generate a first portion of the video content at a first frame rate; (iii) receiving, by the computing system, a second command that is different from the first command; and (iv) responsive to receiving the second command, executing, by the computing system, the second portion of the DVE by sequentially performing the second subset of ordered steps, wherein executing the second portion of the DVE causes the computing system to generate a second portion of the video content at a second frame rate that is different than the first frame rate.

In another aspect, an example non-transitory computer-readable medium is disclosed. The computer-readable medium has stored thereon program instructions that upon execution by a processor, cause performance of a set of acts for use in connection with a computing system configured to execute a DVE by sequentially performing a set of ordered steps, wherein executing the DVE causes the computing system to generate video content, wherein the set of ordered steps comprises a first subset of ordered steps followed by a second subset of ordered steps. The set of acts includes (i) receiving, by the computing system, a first command; (ii) responsive to receiving the first command, executing, by the computing system, the first portion of the DVE by sequentially performing the first subset of ordered steps, wherein executing the first portion of the DVE causes the computing system to generate a first portion of the video content at a first frame rate; (iii) receiving, by the computing system, a second command; and (iv) responsive to receiving the second command, executing, by the computing system, the second portion of the DVE by sequentially performing the second subset of ordered steps, wherein executing the second portion of the DVE causes the computing system to generate a second portion of the video content at a second frame rate that is different than the first frame rate.

In another aspect, an example computing system is disclosed. The computing system is configured for use in connection with a computing system configured to execute a DVE by sequentially performing a set of ordered steps, wherein executing the DVE causes the computing system to generate video content, wherein the set of ordered steps comprises a first subset of ordered steps followed by a second subset of ordered steps. The computing system is configured for performing a set of acts including (i) receiving, by the computing system, a first command; (ii) responsive to receiving the first command, executing, by the computing system, the first portion of the DVE by sequentially performing the first subset of ordered steps, wherein executing the first portion of the DVE causes the computing system to generate a first portion of the video content at a first frame rate; (iii) receiving, by the computing system, a second command; and (iv) responsive to receiving the second command, executing, by the computing system, the second portion of the DVE by sequentially performing the second subset of ordered steps, wherein executing the second portion of the DVE causes the computing system to generate a second portion of the video content at a second frame rate that is different than the first frame rate.

BRIEF DESCRIPTION OF THE DRAWINGS

FIG. 6 is a simplified block diagram of an example program schedule.

DETAILED DESCRIPTION

I. Overview

Figure 1:
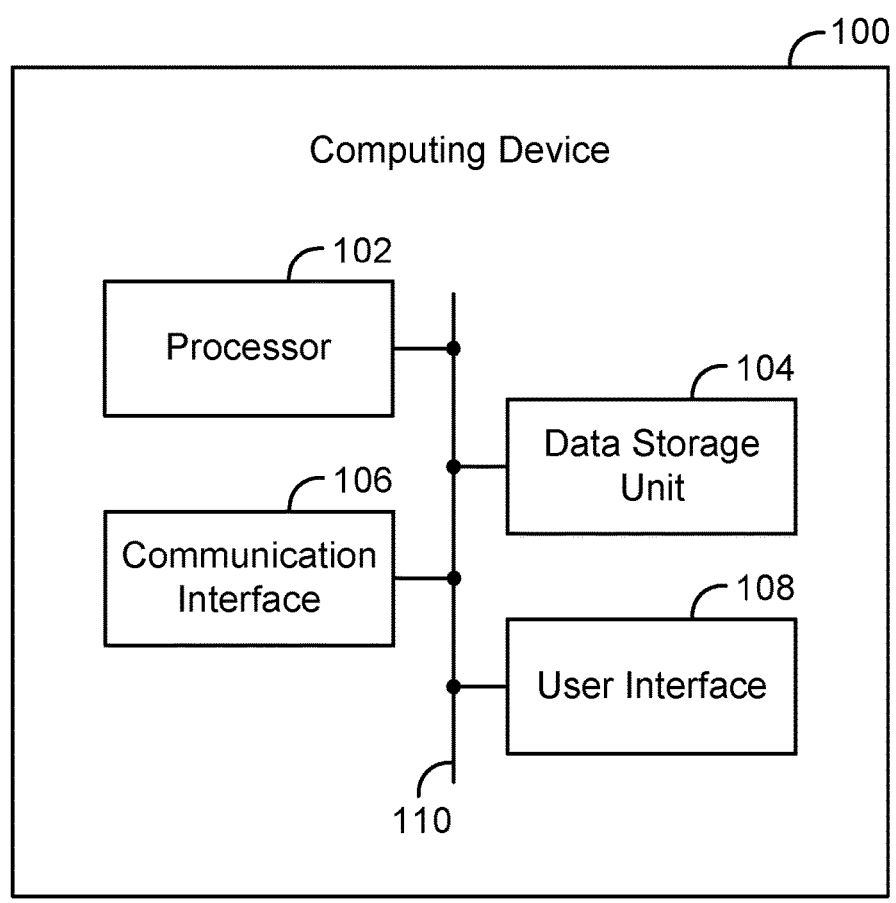
FIG. 1 is a simplified block diagram of an example computing device.

A video-production system (VPS) can generate video content that can serve as or be part of a video program (e.g., a news program). The VPS can then transmit the video content to a video-broadcast system (VBS), which in turn can transmit the video content to an end-user device for presentation of the video content to an end-user.

The VPS can include various components to facilitate generating video content. For example, the VPS can include a social media (SM) system, a first DVE system, a video source, a second DVE system, a scheduling system, and a sequencing system.

The SM system can obtain a SM content item, and can transmit the SM content item to the first DVE system. The first DVE system can receive the SM content item and can execute a DVE, which causes the first DVE system to generate first video content that includes the received SM content item. The first DVE system can then transmit the first video content to the second DVE system.

The video source can generate second video content, and can transmit the second video content to the second DVE system.

The second DVE system can receive the first video content and the second video content, and can execute a DVE, which causes the DVE system to overlay the first video content on the second video content, thereby modifying the second video content. The modified second video content can serve as or be part of a video program. Thus, in this way, the VPS can integrate a SM content item into a video program.

The scheduling system can create a program schedule, perhaps based on input received from a user (e.g., a producer or technical director) via a user interface. The sequencing system can process records in the program schedule, and based on the processed records, can control one or more components of the VPS, such as the SM system, the first DVE system, the video source, and the second DVE system, to facilitate generating video content.

As noted above, the first DVE system can execute a DVE, which causes the first DVE system to generate first video content that includes a SM content item. The first DVE system can execute a DVE based on a DVE template.

A DVE template can specify various aspects of a DVE. For example, the DVE template can specify a set of ordered steps, and various timing aspects, such as when each step is to start being performed and for how long each step is to be performed. The steps can relate to retrieving and/or arranging SM content items (or any types of content items) within a specified frame or specified frames of video content.

In some instances, the first DVE system can receive a command, and responsive to receiving the command, the first DVE system can execute a DVE, thereby causing the first DVE system to generate video content, which the VPS can integrate into a video program.

In some cases, it can be desirable to integrate into the video program, the second portion of the video content, but not the first portion of the video content. To provide such functionality, separate commands can separately cause the first DVE system to perform subsets of ordered steps. To illustrate this, consider a scenario where the first DVE system is configured to execute a DVE by sequentially performing a set of ordered steps, where executing the DVE causes the first DVE system to generate video content, and where the set of ordered steps includes a first subset of ordered steps followed by a second subset of ordered steps. In this scenario, the first DVE system can receive a first command, and responsive to receiving the first command, the first DVE system can execute the first portion of the DVE by sequentially performing the first subset of ordered steps. This can cause the first DVE system to generate a first portion of the video content. The first DVE system can then receive a second command, and responsive to receiving the second command, the first DVE system can execute the second portion of the DVE by sequentially performing the second subset of ordered steps. This can cause the first DVE system to generate a second portion of the video content.

The first DVE system can receive each of the first and second commands in various ways. For example, the DVE system can receive the first and/or second command from the sequencing system or from a user via a user interface of the first DVE system. In this way, the sequencing system or a user can separately control when the first DVE system generates the first and second portions of the video content.

II. Example Architecture

A. Computing Device

FIG. 1 is a simplified block diagram of an example computing device 100. The computing device can be configured to perform and/or can perform one or more acts and/or functions, such as those described in this disclosure. The computing device 100 can include various components, such as a processor 102, a data storage unit 104, a communication interface 106, and/or a user interface 108. Each of these components can be connected to each other via a connection mechanism 110.

In this disclosure, the term "connection mechanism" means a mechanism that facilitates communication between two or more components, devices, systems, or other entities. A connection mechanism can be a relatively simple mechanism, such as a cable or system bus, or a relatively complex mechanism, such as a packet-based communication network (e.g., the Internet). In some instances, a connection mechanism can include a non-tangible medium (e.g., in the case where the connection is wireless).

The processor 102 can include a general-purpose processor (e.g., a microprocessor) and/or a special-purpose processor (e.g., a digital signal processor (DSP)). The processor 102 can execute program instructions contained in the data storage unit 104 as discussed below.

The data storage unit 104 can include one or more volatile, non-volatile, removable, and/or non-removable storage components, such as magnetic, optical, and/or flash storage, and/or can be integrated in whole or in part with the processor 102. Further, the data storage unit 104 can take the form of a non-transitory computer-readable storage medium, having stored thereon program instructions (e.g., compiled or non-compiled program logic and/or machine code) that, upon execution by the processor 102, cause the computing device 100 to perform one or more acts and/or functions, such as those described in this disclosure. These program instructions can define and/or be part of a discrete software application. In some instances, the computing device 100 can execute program instructions in response to receiving an input, such as from the communication interface 106 and/or the user interface 108. The data storage unit 104 can also store other types of data, such as those types described in this disclosure.

The communication interface 106 can allow the computing device 100 to connect with and/or communicate with another entity according to one or more protocols. In one example, the communication interface 106 can be a wired interface, such as an Ethernet interface or a high-definition serial-digital-interface (HD-SDI). In another example, the communication interface 106 can be a wireless interface, such as a cellular or WI-FI interface. In this disclosure, a connection can be a direct connection or an indirect connection, the latter being a connection that passes through and/or traverses one or more entities, such as a router, switcher, or other network device. Likewise, in this disclosure, a transmission can be a direct transmission or an indirect transmission.

The user interface 108 can include hardware and/or software components that facilitate interaction between the computing device 100 and a user of the computing device 100, if applicable. As such, the user interface 108 can include input components such as a keyboard, a keypad, a mouse, a touch-sensitive panel, a microphone, and/or a camera, and/or output components such as a display device (which, for example, can be combined with a touch-sensitive panel), a sound speaker, and/or a haptic feedback system.

The computing device 100 can take various forms, such as a workstation terminal, a desktop computer, a laptop, a tablet, a mobile phone, a set-top box, and/or a television.

B. Video System

Figure 2:
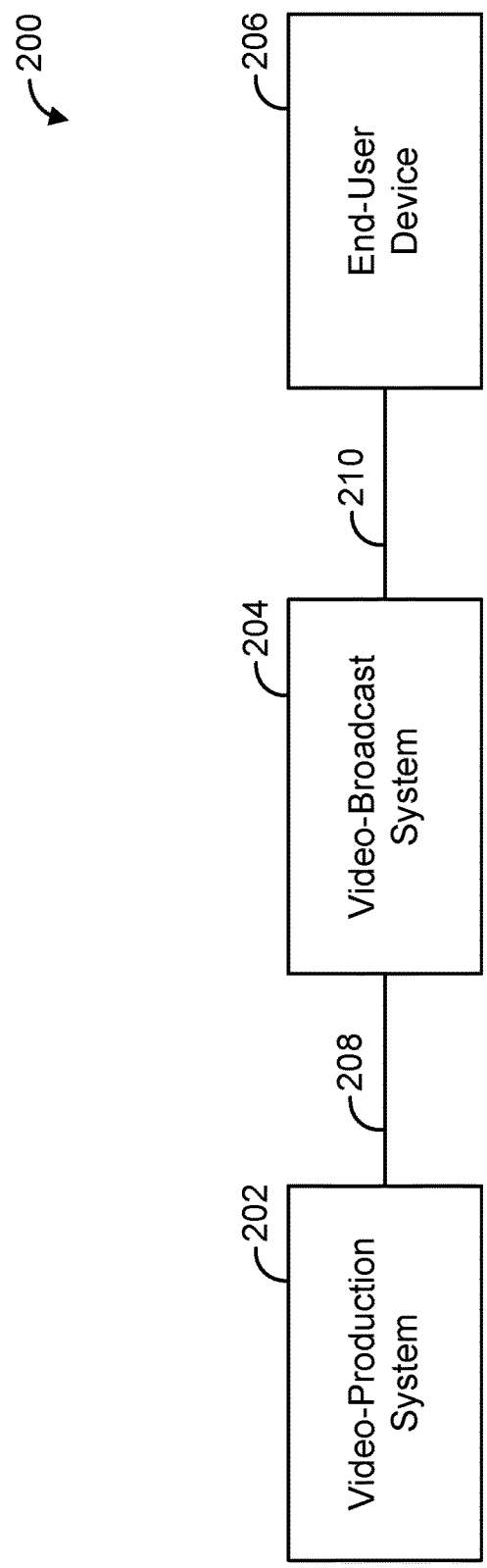
FIG. 2 is a simplified block diagram of an example video system.

FIG. 2 is a simplified block diagram of an example video system 200. The video system 200 can perform various acts and/or functions related to video content, and can be implemented as a computing system. In this disclosure, the term "computing system" means a system that includes at least one computing device. In some instances, a computing system can include one or more other computing systems.

The video system 200 can include various components, such as a VPS 202, a VBS 204, and an end-user device 206, each of which can be implemented as a computing system. The video system 200 can also include a connection mechanism 208, which connects the VPS 202 with the VBS 204; and a connection mechanism 210, which connects the VBS 204 with the end-user device 206.

Figure 3:
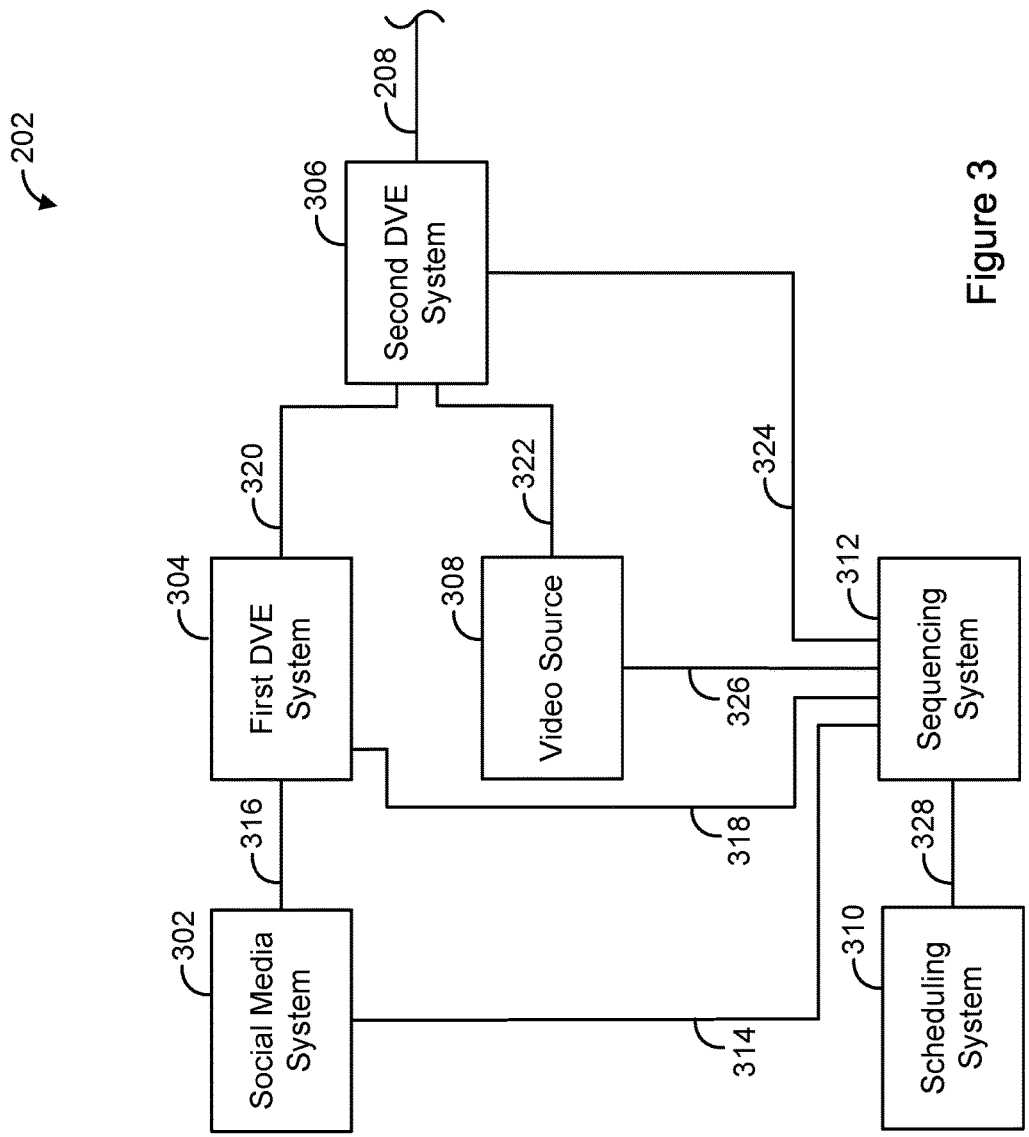
FIG. 3 is a simplified block diagram of an example video-production system.

FIG. 3 is a simplified block diagram of an example VPS 202. The VPS 202 can include various components, such as a SM system 302, a first DVE system 304, a second DVE system 306, a video source 308, a scheduling system 310, and a sequencing system 312, each of which can be implemented as a computing system. The VPS 202 can also include a connection mechanism 314, which connects the SM system 302 with the sequencing system 312; a connection mechanism 316, which connects the SM system 302 with the first DVE system 304; a connection mechanism 318, which connects the first DVE system 304 with the sequencing system 312; a connection mechanism 320, which connects the first DVE system 304 with the second DVE system 306; a connection mechanism 322, which connects the second DVE system 306 with the video source 308; a connection mechanism 324, which connects the second DVE system 306 with the sequencing system 312; a connection mechanism 326, which connects the video source 308 with the sequencing system 312; and a connection mechanism 328, which connects the scheduling system 310 with the sequencing system 312.

The first DVE system 304 can take various forms. An example first DVE system is the VIZ TRIO provided by Viz Rt of Bergen, Norway. Another example first DVE system is CASPAR CG developed and distributed by the Swedish Broadcasting Corporation (SVT).

The second DVE system 306 can take various forms, such as a production switcher. An example production switcher is the VISION OCTANE production switcher provided by Ross Video Ltd. of Iroquois, Ontario in Canada.

The video source 308 can take various forms, such as a video server, a video camera, a satellite receiver, or a DVE system. An example video server is the K2 server provided by Grass Valley of San Francisco, Calif.

The scheduling system 310 can take various forms. An example scheduling system is WO TRAFFIC provided by WideOrbit, Inc. of San Francisco, Calif. Another example scheduling system is OSI-TRAFFIC provided by Harris Corporation of Melbourne, Fla.

The sequencing system 312 can take various forms. A sequencing system is sometimes referred to in the industry as a "production automation system."

Referring back to FIG. 2, the VBS 204 can include various components, such as a terrestrial antenna or a satellite transmitter, each of which can be implemented as a computing system.

Each of the video-based entities described in this disclosure can include or be integrated with a corresponding audio-based entity. Also, the video content described in this disclosure can include or be integrated with corresponding audio content.

III. Example Operations

The video system 200 and/or components thereof can perform various acts and/or functions. These acts/and or functions and related features will now be described.

The video system 200 can perform various acts and/or functions related to video content. For example, the video system 200 can receive, generate, output, and/or transmit video content that can serve as or be part of a video program (e.g., a news program). In this disclosure, the act of receiving, generating, outputting, and/or transmitting video content can occur in various ways and/or according to various standards. For example, the act of receiving, outputting, and/or transmitting video content can include receiving, outputting, and/or transmitting a video stream representing the video content, such as over Internet Protocol (IP) or in accordance with the high-definition serial digital interface (HD-SDI) standard. Likewise, the act of generating content can include generating a video stream representing the video content. Also, the act of receiving, generating, outputting, and/or transmitting video content can include receiving, generating, outputting, and/or transmitting an encoded or decoded version of the video content.

The VPS 202 can perform various acts and/or functions related to video content production. For example, the VPS 202 can generate and/or output video content, and can transmit the video content to another entity, such as the VBS 204.

Referring back to FIG. 3, within the VPS 202, the SM system 302 can perform various acts and/or functions related to SM content. In this disclosure, "SM content" is content that has been published on a SM platform, which is a computer-based tool that allows users to create, share, and/or exchange content (e.g., in the form of text, images, and/or videos) in virtual communities on a computer-based network such as the Internet. Examples of SM platforms include TWITTER, YOUTUBE, FACEBOOK, PERISCOPE, INSTAGRAM, MEERKAT, LINKEDIN, and GOOGLE+.

The SM system 302 can receive a SM content item and can do so in various ways. For example, the SM system 302 can receive a SM content item by obtaining it from another entity, such as a SM platform. In one example, the SM system 302 can obtain a SM content item directly from a SM platform. In another example, the SM system can obtain a SM content item from a SM platform via a SM dashboard application (e.g., TWEETDECK, CYFE, or HOOTSUITE). In some instances, a SM dashboard application can provide additional searching and browsing functionalities (e.g., based on trend analysis or analytics) that may not be provided by the SM platform itself, and/or can provide access to multiple SM platforms through a single user interface.

A SM content item can include various elements such as (i) data indicating the SM platform from which the SM content item was received, (ii) data identifying the publisher of the SM content item (e.g., an account identifier, such as a username), (iii) a profile image corresponding to the publisher of the SM content item, (iv) text published by the publisher in connection with the SM content item, (v) an image published by the publisher in connection with the SM content item, (vi) audio content published by the publisher in connection with the SM content item, (vii) video content published by the publisher in connection with the SM content item (viii) a timestamp indicating a time and/or date at which the SM content item was published on the SM platform, (ix) a location (e.g., represented by global positioning system (GPS) coordinates) of the publisher when the SM content item was published, (x) a location at which an aspect of the SM content item occurred (e.g., where video content was recorded or where a photograph was taken), (xi) a timestamp indicating when an aspect of the SM content item occurred, (xii) a number of other users associated with the publisher on a SM platform (e.g., a number of friends or followers), (xiii) an indication of how long the publisher has been a user of a SM platform, (xiv) a number of times the SM content item has been shared (e.g., retweeted) by other users of a SM platform, (xv) a number of posts by the publisher on a SM platform, and/or (xvi) any other data that can be integrated into a video program.

The SM system 302 can also store, select, and/or retrieve a SM content item, perhaps based on input received from a user (e.g., a producer or technical director) via a user interface. As such, the SM system 302 can store an obtained SM content item in a data storage unit (e.g., a data storage unit of the SM system 302), and can then receive the SM content item by selecting and retrieving it from the data storage unit.

The SM system 302 can also modify a SM content item and can do so in various ways. In one example, the SM system 302 can modify a SM content item by adding an element to the SM content item. For instance, the SM system 302 can add a unique identification (ID) number to a stored SM content item to facilitate managing the stored SM content item. In another example, the SM system 302 can modify a SM content item by removing an element of the SM content item or modifying an element of the SM content item. Among other things, this can allow the SM system 302 to remove vulgarities, personal information, and/or extraneous information that is not suitable or desirable for integration into a video program.

The SM system 302 can also transmit a SM content item to another entity, such as the first DVE system 304.

The first DVE system 304 can perform various acts and/or functions related to DVEs. For example, the first DVE system 304 can perform a set of steps based on a DVE template to generate and/or output video content. This is sometimes referred to as "executing a DVE." The first DVE system 304 can create and/or modify a DVE template, perhaps based on input received from a user via a user interface. Further, the first DVE system 304 can store and/or retrieve a DVE template, perhaps based on input received from a user via a user interface. As such, the first DVE system 304 can store a DVE template in a data storage unit (e.g., a data storage unit of the second DVE system 306), and can then receive the DVE template by selecting and retrieving it from the data storage unit.

In some instances, the first DVE system 304 can use the DVE template and content to generate and/or output video content that includes the content. The first DVE system 304 can receive content in various ways. For example, the first DVE system 304 can do so by receiving it from another entity, such as the SM system 302. In another example, the first DVE system 304 can receive content by selecting and retrieving it from a data storage unit (e.g., a data storage unit of the SM system 302).

A DVE template can specify how the first DVE system 304 is to receive content. In one example, a DVE template can do so by specifying that the first DVE system 304 is to receive content on a particular input of the first DVE system 304 (e.g., an input that maps to a particular entity, such as the SM system 302). In another example, a DVE template can do so by specifying that the first DVE system 304 is to receive content by retrieving it from a particular location of a particular data storage unit (e.g., a data storage unit of the first DVE system 304).

After the first DVE system 304 generates and/or outputs video content, the first DVE system 304 can transmit the video content to another entity, such as the second DVE system 306, and/or can store the video content in a data storage unit (e.g., a data storage unit of the first DVE system 304). As such, in one example, the first DVE system 304 can receive a SM content item, can use the SM content item to generate and/or output video content that includes the SM content item, and can transmit the video content to the second DVE system 306.

A DVE template can specify various aspects of a DVE. For example, the DVE template can specify a set of ordered steps, and various timing aspects, such as when each step is to start being performed and for how long each step is to be performed. The steps can relate to retrieving and/or arranging SM content items (or any types of content items) within a specified frame or specified frames of video content. The DVE template can specify that a given step is to be performed at a predefined time, or that a given step is to be performed at the occurrence of, or after a time offset from the occurrence of, a particular event, such as the conclusion of the performance of a previous step, which can have a particular duration. In another example, the occurrence of the particular event can be the receipt of input from a user via a user interface.

To illustrate aspects of a DVE, an example DVE will now be discussed. In this example, the first DVE system 304 can execute a DVE that causes the first DVE system 304 to generate video content showing overlay images A, B, C, and D "moving" from right to left over a background image. FIGS. 4A-4D, which are simplified depictions of example frames of the generated video content at various states of the DVE execution process, help illustrate this example.

Figure 4A:
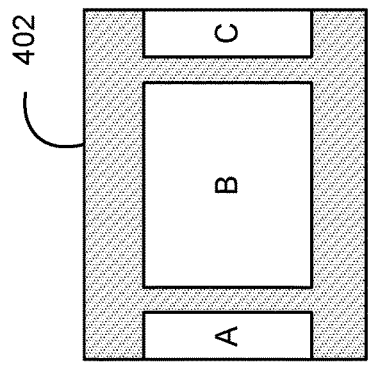
FIG. 4A is a simplified diagram of an example frame of video content, resulting from the performance of a first step in connection with a DVE.

During a first time period, the first DVE system 304 can perform a first step that involves "moving" from right to left, images A and B until image A is positioned over a center region of the background image. FIG. 4A is a simplified depiction of an example frame 400 at the end of the first time period.

Figure 4B:
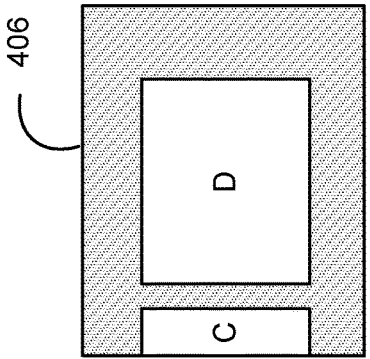
FIG. 4B is a simplified diagram of an example frame of video content, resulting from the performance of a second step in connection with the DVE.

During a next, second time period, the first DVE system 304 can perform a second step that involves "moving" from right to left, images A, B, and C until image B is positioned over the center region of the background image. FIG. 4B is a simplified depiction of an example frame 402 at the end of the second time period.

Figure 4C:
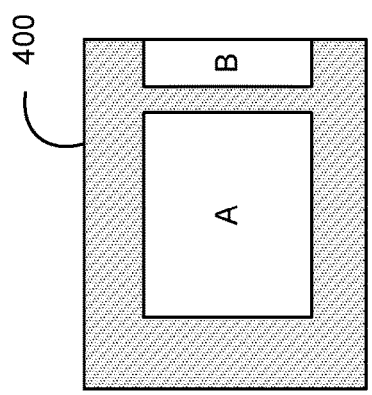
FIG. 4C is a simplified diagram of an example frame of video content resulting from the performance of a third step in connection with the DVE.

During a next, third time period, the first DVE system 304 can perform a third step that involves "moving" from right to left, images B, C, and D until image C is positioned over the center region of the background image. FIG. 4C is a simplified depiction of an example frame 404 at the end of the third time period.

Figure 4D:
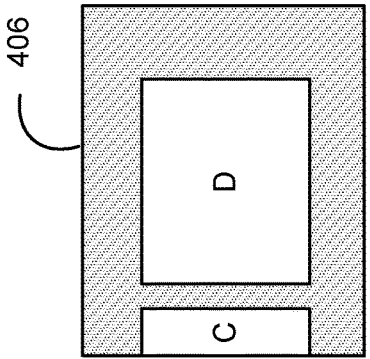
FIG. 4D is a simplified diagram of an example frame of video content resulting from the performance of a fourth step in connection with the DVE.

During a next, fourth time period, the first DVE system 304 can perform a fourth step that involves "moving" from right to left, images C and D until image D is positioned over the center region of the background image. FIG. 4D is a simplified depiction of an example frame 406 at the end of the fourth time period.

As noted above, the DVE template can specify various timing aspects, such as when each step is to start being performed and for how long each step is to be performed. As such, in one example, the DVE template can specify that the first DVE system 304 is to start performing the first step at a particular time, and that each of steps two, three, and four are to start being performed five seconds after performance of the previous step has concluded. Further, the DVE template can specify that each step is to be performed for two seconds.

As such, at the start time, the first DVE system 304 can begin performing the first step. Two second later, the first DVE system 304 can conclude performing the first step (frame 400). Five seconds later, the first DVE system 304 can begin performing the second step. Two second later, the first DVE system 304 can conclude performing the second step (frame 402). Five seconds later, the first DVE system 304 can begin performing the third step. Two second later, the first DVE system 304 can conclude performing the third step (frame 404). Five seconds later, the first DVE system 304 can begin performing the fourth step. Two second later, the first DVE system 304 can conclude performing the fourth step (frame 406). This results in the each of the images A, B, C, and D being shown in the center region for five seconds before moving left.

It should be appreciated that the first DVE system 304 can execute a wide variety of different types of DVEs, and can thus generate a wide variety of different types of video content. Among other things, a DVE can involve inserting, moving, removing, overlaying, and/or scaling various different types of content, such as text, image, and video content.

In some instances, the first DVE system 304 can receive a command, and responsive to receiving the command, the first DVE system 304 can execute a DVE, thereby causing the first DVE system 304 to generate video content. As described in greater detail below, the VPS can then integrate the generated video content into a video program.

The first DVE system 304 can receive the command in various ways. For example, the DVE system 304 can receive a command from the sequencing system 312 or from a user via a user interface of the first DVE system 304. In this way, the sequencing system 312 or a user can control when the first DVE system 304 executes a DVE and corresponding generated video content.

As noted above, the first DVE system 304 can perform a set of steps based on a DVE template to generate and/or output video content, and the VPS 202 can integrate the generated video content into a video program. However, in some instances, it may be desirable to integrate only a portion of the generated video content into the video program. This can be the case where it is desired to "seek to" or "fast forward to" a particular place within the video content that can be generated by executing the DVE.

Turning back to the example discussed above in connection with FIGS. 4A-4B, recall that the first DVE system 304 performs four steps to execute the DVE, and that each of frames 400, 402, 404, and 406 represents the state of the generated video content after each of the first, second, third, and fourth steps, respectively. The generated video content can be considered to have two or more portions. For example, the generated video content can be considered to have a first portion that extends from the start of the generated video content to frame 404, and a second portion that extends from frame 404 to the end of the generated video content.

In some cases, it can be desirable to integrate into the video program, the second portion of the video content, but not the first portion of the video content. To provide such functionality, the first DVE system 304 can perform the first and second steps in advance of a time T, and can then pause execution of the DVE. Then, at time T when the VPS 202 is ready to integrate video content into a video program, the first DVE system 304 can resume execution of the DVE, and can generate just the second portion of the video content, such that it can be integrated into the video program. As such, in one example, from among the generated first portion of the video content and the generated second portion of the video content, the VPS 202 can integrate only the generated second portion of the video content into a video program.

In some instances, the first DVE system 304 can generate the first and second portions of video content at different frame rates. For example, the DVE system 304 can generate the first portion of video content at a first frame rate that is greater than a second frame of the generated second portion. This can allow the first DVE system 304 to cue of the start of the second portion of video content with short notice.

In some cases, it can also be desirable to "rewind to" a particular place in the video content generated as a result of executing a DVE. For example, in connection with the example relating to FIGS. 4A-4B, in the case where both the first and second portions of the generated video content are integrated into the video program, it may be desirable to "rewind to" frame 404, and again show just the second portion of the generated video content.

To provide the functionality discussed above, separate commands can cause the first DVE system 304 to separately perform separate subsets of steps. To illustrate this, consider a scenario where the first DVE system 304 is configured to execute a DVE by sequentially performing a set of ordered steps, where executing the DVE causes the first DVE system 304 to generate video content, and where the set of ordered steps includes a first subset of ordered steps followed by a second subset of ordered steps. In this scenario, the first DVE system 304 can receive a first command, and responsive to receiving the first command, the first DVE system 304 can execute the first portion of the DVE by sequentially performing the first subset of ordered steps. This can cause the first DVE system 304 to generate a first portion of the video content. The first DVE system 304 can then receive a second command, and responsive to receiving the second command, the first DVE system 304 can execute the second portion of the DVE by sequentially performing the second subset of ordered steps. This can cause the first DVE system 304 to generate a second portion of the video content.

The first DVE system 304 can receive each of the first and second commands in various ways. For example, the DVE system 304 can receive the first and/or second command from the sequencing system 312 or from a user via a user interface of the first DVE system 304. In this way, the sequencing system 312 or a user can separately control when the first DVE system 304 generates the first and second portions of the video content.

Using the techniques described above, the first DVE 304 can perform "seek," "fast forward," and "rewind" operations in connection with the execution of a DVE. In this way, the sequencing system 312 can control operation of the first DVE system 304 with traditional commands (e.g., Video Disk Control Protocol (VDCP)-compliant commands) as if the first DVE system were a traditional media server.

The video source 308 can generate and/or output video content, and can transmit the video content to another entity, such as the second DVE system 306. In practice, the VPS 202 is likely to include multiple video sources and corresponding connection mechanisms, each connecting a respective one of the video sources with the second DVE system 306.

As noted above, the video source 308 can take the form of a video server. A video server can record and/or store video content (e.g., in the form of a file). Further, the video server can retrieve stored video content and can use the retrieved video content to generate and/or output a video stream representing the video content. This is sometimes referred to in the industry as the video server playing out the video content. The video server can then transmit the video stream, thereby transmitting the video content, to another entity, such as the second DVE system 306.

Like the first DVE system 304, the second DVE system 306 can use a DVE template to generate and/or output video content. As such, the second DVE system 306 can also execute a DVE. Generally, the first DVE system 304 is used to execute certain types of DVEs and the second DVE system 306 is used to execute other types of DVEs, namely those that are more suited to be executed downstream in the video production process. However, various DVE-related configurations are possible. For example, the first DVE system 304 or the second DVE system 306 can execute a DVE typically performed by the other system. As another example, the VPS 202 can instead include a single DVE system that provides the functionality of the first DVE system 304 and/or the second DVE system 306.

As with the first DVE system 304, the second DVE system 306 can create and/or modify a DVE template, perhaps based on input received from a user via a user interface. Further, the second DVE system 306 can store and/or retrieve a DVE template, perhaps based on input received from a user via a user interface. As such, the second DVE system 306 can store a DVE system template in a data storage unit (e.g., a data storage unit of the second DVE system 306), and can then receive the DVE template by selecting and retrieving it from the data storage unit.

In some instances, the second DVE system 306 can use the DVE template and content to generate and/or output video content that includes the content. The second DVE system 306 can receive content in various ways. For example, the second DVE system 306 can do so by receiving it from another entity, such as the video source 308 and/or the first DVE system 304. In another example, the second DVE system 306 can do so by selecting and retrieving it from a data storage unit (e.g., a data storage unit of the second DVE system 306).

The DVE template can specify how the second DVE system 306 is to receive content. In one example, the DVE template can do so by specifying that the second DVE system 306 is to receive content on a particular input of the second DVE system 306 (e.g., an input that maps to a particular entity, such as the video source 308 or the first DVE system 304). In another example, the DVE template can do so by specifying that the second DVE system 306 is to receive content by retrieving it from a particular location of a particular data storage unit (e.g., a data storage unit of the second DVE system 306).

A DVE template can be configured in various ways, which can allow the second DVE system 306 to execute various types of DVEs. In one example, a DVE template can specify that the second DVE system 306 is to receive video content from the video source 308 and other content (e.g., video content showing scrolling images) from a data storage unit of the second DVE system 306, and is to overlay the other content on the video content, thereby generating a modified version of the video content. As such, in one example, the second DVE system 306 can generate video content by modifying video content.

Figure 5A:
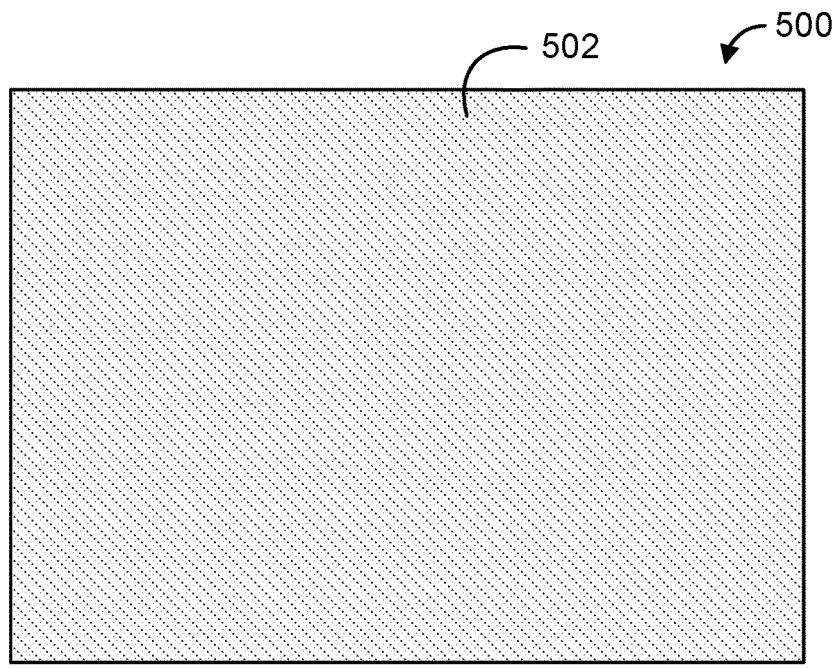
FIG. 5A is a simplified diagram of an example frame of video content, without content overlaid thereon.
Figure 5B:
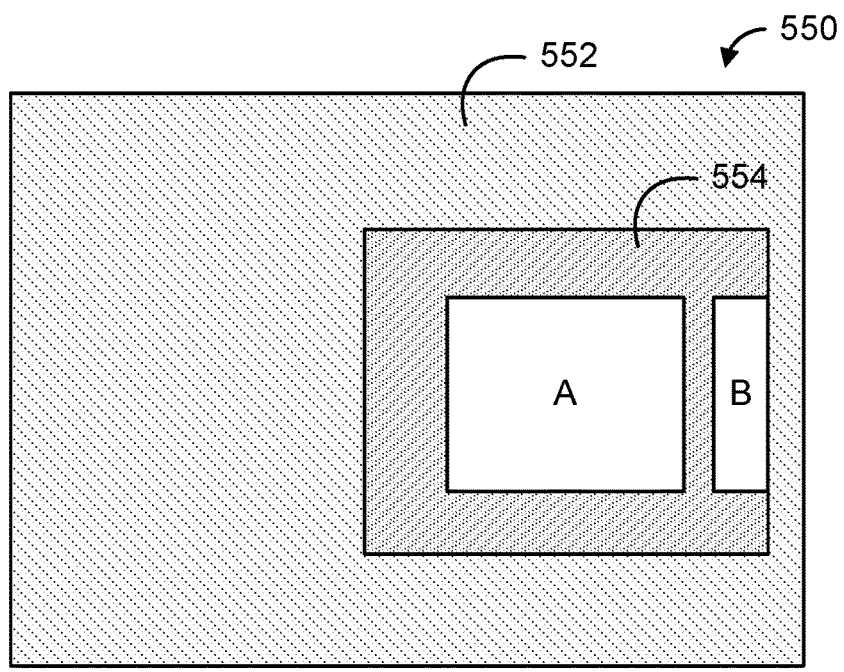
FIG. 5B is a simplified diagram of an example frame of video content, with content overlaid thereon.

FIGS. 5A and 5B help illustrate this concept of overlaying other content on video content. FIG. 5A is a simplified depiction of an example frame 500 of video content. Frame 500 includes content 502, but does not include other content overlaid on content 502. For comparison, FIG. 5B is a simplified depiction of another example frame 550 of video content. Frame 550 includes content 552 and other content 554 overlaid on content 552.

In another example, a DVE template can specify that the second DVE system 306 is to receive first video content from the video source 308 and second video content from the first DVE system 304, and is to overlay the second video content on the first video content, thereby generating a modified version of the first video content.

In another example, a DVE template can specify that the second DVE system 306 is to receive first video content from the video source 308 and second video content from the first DVE system 304, and is to scale-down and re-position the first video content and the second video content, each in a respective one of two windows positioned side-by-side. As such, the second DVE system 306 can generate video content by scaling and/or re-positioning video content.

After the second DVE system 306 generates and/or outputs the video content, the second DVE system 306 can transmit the video content to another entity, such as the VBS 204, or can store the video content in a data storage unit (e.g., a data storage unit of the second DVE system 306).

As such, in one example, the second DVE system 306 can receive first video content including a SM content item, can use the first video content to generate and/or output second video content that includes the SM content item. This is an example way in which the VPS 202 can integrate a SM content item into a video program.

The VPS 202 can also integrate a SM content item into a video program in other ways. For example, in the case where the video source 308 is a video camera, the SM system 302 can include a display device that is located within a field of the view of the video camera while the video camera records video content that serves as or is made part of the video program. In one example, the display device can be touch-enabled, which can allow a user (e.g., a news anchor) to interact with the SM content item. To facilitate the user's interaction with the SM content item, the display device and/or other components of the SM system 302 can be programmed with instructions that cause particular actions in response to particular touch commands.

In one example, the display device can initially display multiple small tiles, each representing a different SM content item. In this example, the SM content items can relate to weather conditions captured in photographs published on SM platforms by various different publishers. As such, each tile can display a different photograph. The position and ordering of the small tiles can be determined by a character generator template and/or a DVE template. Either template can also include programming instructions that can allow the commands provided via the touch screen display to cause predefined actions for the displayed SM content items. For example, if a meteorologist taps on one of the small items a first time, the programming instructions can cause the tile to expand to enlarge the photograph and perhaps display additional elements of, or information associated with, the SM content item (e.g., a username, time, location, and/or text published in connection with the SM content item). Other commands can cause an expanded tile to return to its initial size and position. As the meteorologist interacts with the SM content items displayed on the display device, the video camera can generate video content including these interactions and thereby integrate the SM content items into the video program.

The scheduling system 310 can perform various acts and/or functions related to the scheduling of video content production. For example, the scheduling system 310 can create and/or modify a program schedule of a video program, perhaps based on input received from a user via a user interface. Further, the scheduling system 310 can store and/or retrieve a program schedule, perhaps based on input received from a user via a user interface. As such, the scheduling system 310 can store a program schedule in a data storage unit (e.g., a data storage unit of the scheduling system 310), and can then receive the program schedule by selecting and retrieving it from the data storage unit. The scheduling system 310 can also transmit a program schedule to another entity, such as the sequencing system 312.

The sequencing system 312 can process records in the program schedule. This can cause the sequencing system 312 to control one or more other components of the VPS 202 to facilitate the VPS 202 generating and/or outputting video content, which can serve as or be part of a video program. For example, the sequencing system 312 can control the SM system 302, the first DVE system 304, the second DVE system 306, and/or the video source 308 to perform the various acts and/or functions described in this disclosure.

The sequencing system 312 can receive a program schedule in various ways. For example, the sequencing system 312 can do so by receiving it from another entity, such as the scheduling system 310. In another example, the first DVE system 304 can do so by selecting and retrieving it from a data storage unit (e.g., a data storage unit of the scheduling system 310).

A program schedule (sometimes referred to in the industry as a "rundown") serves as a schedule or outline of a video program and can include multiple records. A video program can be conceptually divided into multiple logically-separated portions (sometimes referred to in the industry as "stories"). As such, each portion of the video program can be represented by a separate record of the program schedule. In some cases, each record can also include one or more sub-records. Each record (including a sub-record) can include various types of data.

FIG. 6 is a simplified diagram of an example program schedule 600. The program schedule 600 includes ten records represented as ten ordered rows. Each record corresponds to a respective portion of a video program, except for one which corresponds to a commercial break. For each portion, the respective record specifies at least one data item that corresponds to that portion of the video program. In particular, each record specifies at least one of a story title, a video content item identifier, a duration, and a DVE template identifier (which can serve as an instruction to execute a corresponding DVE).

A video content item can consist of logically-related video content. For example, a video content item can be video content that covers a particular news story.

As shown in FIG. 5, the first record specifies a story title of STORY A, a video content item identifier of VCI ID A, a duration of 00:02:00:00 (in hours::minutes:: seconds:: frames format). As such, upon the sequencing system 312 processing the first record, the sequencing system 312 can cause the video source 308 to playout a video content item identified by the identifier VCI ID A for two minutes.

The program schedule 600 has been greatly simplified for the purposes of illustrating certain features. In practice, a program schedule is likely to include significantly more data. For example, the program schedule 600 can include information relating to DVEs, such as those described above. For example, the program schedule 600 can refer to a particular DVE, and can include an indication as to when which types of commands (perhaps in the form of VDCP-compliant commands) should be sent to the first DVE system 304 and/or the second DVE system 306 to cause the DVE systems to execute the DVE, or portions thereof, as desired.

In some instances, the sequencing system 312 can process a next record in the program schedule based on a trigger event. In one example, the trigger event can be the sequencing system 312 completing one or more actions related to a current record in the program schedule. In another example, the trigger event can be the sequencing system 312 receiving input from a user via a user interface.

Referring back to FIG. 2, the VBS 204 can receive video content from the VPS 202, which in turn can transmit the video content to the end-user device 206 for presentation of the video content to an end user. In practice, the VBS 204 can transmit video content to a large number of end-user devices for presentation of the video content to a large number of end users. The VBS 204 can transmit video content to the end-user device 206 in various ways. For example, VBS 204 can transmit video content to the end-user device 206 over-the-air or via a packet-based network such as the Internet. The end-user device 206 can receive video content from the VBS 204, and can present the video content to an end user via a user interface.

Figure 7:
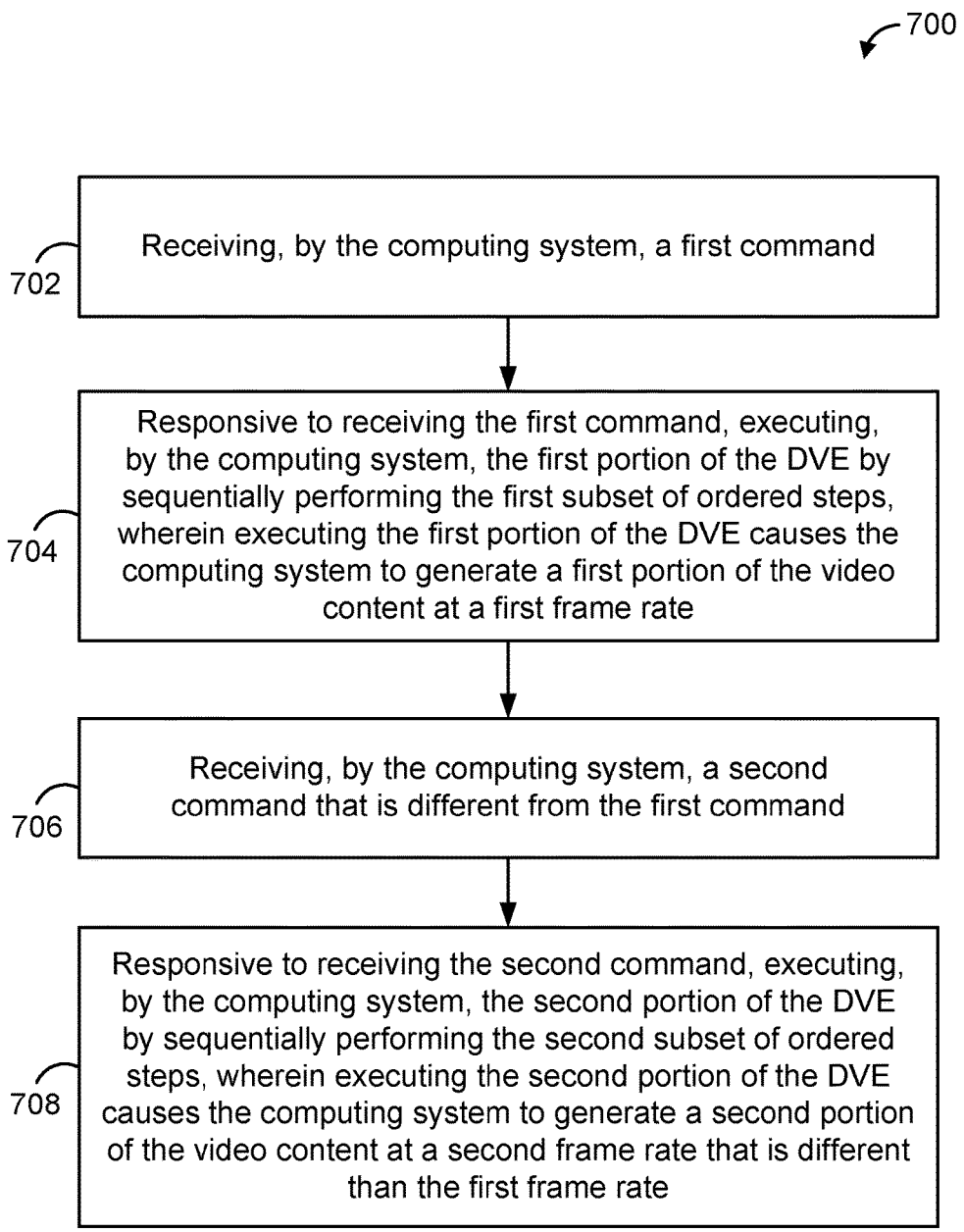
FIG. 7 is a flow chart of an example method.

FIG. 7 is a flow chart illustrating an example method 700 for use in connection with a computing system configured to execute a DVE by sequentially performing a set of ordered steps, wherein executing the DVE causes the computing system to generate video content, wherein the set of ordered steps comprises a first subset of ordered steps followed by a second subset of ordered steps.

At block 702, the method 700 can include receiving, by the computing system, a first command.

At block 704, the method 700 can include responsive to receiving the first command, executing, by the computing system, the first portion of the DVE by sequentially performing the first subset of ordered steps, wherein executing the first portion of the DVE causes the computing system to generate a first portion of the video content at a first frame rate.

At block 706, the method 700 can include receiving, by the computing system, a second command that is different from the first command.

At block 708, the method 700 can include responsive to receiving the second command, executing, by the computing system, the second portion of the DVE by sequentially performing the second subset of ordered steps, wherein executing the second portion of the DVE causes the computing system to generate a second portion of the video content at a second frame rate that is different than the first frame rate.

IV. Example Variations

Although some of the acts and/or functions described in this disclosure have been described as being performed by a particular entity, the acts and/or functions can be performed by any entity, such as those entities described in this disclosure. Further, although the acts and/or functions have been recited in a particular order, the acts and/or functions need not be performed in the order recited. However, in some instances, it can be desired to perform the acts and/or functions in the order recited. Further, each of the acts and/or functions can be performed responsive to one or more of the other acts and/or functions. Also, not all of the acts and/or functions need to be performed to achieve one or more of the benefits provided by this disclosure, and therefore not all of the acts and/or functions are required.

Although certain variations have been discussed in connection with one or more example of this disclosure, these variations can also be applied to all of the other examples of this disclosure as well.

Although select examples of this disclosure have been described, alterations and permutations of these examples will be apparent to those of ordinary skill in the art. Other changes, substitutions, and/or alterations are also possible without departing from the invention in its broader aspects as set forth in the following claims.

The invention claimed is:

1. A method for use in connection with a computing system configured to execute a digital-video effect (DVE) by sequentially performing a set of ordered steps, wherein executing the DVE causes the computing system to generate video content, wherein the set of ordered steps comprises a first subset of ordered steps followed by a second subset of ordered steps, the method comprising:
   receiving, by the computing system, a first command;
   responsive to receiving the first command, executing, by the computing system, a first portion of the DVE by sequentially performing the first subset of ordered steps, wherein executing the first portion of the DVE causes the computing system to generate a first portion of the video content at a first frame rate;
   receiving, by the computing system, a second command that is different from the first command; and
   responsive to receiving the second command, executing, by the computing system, a second portion of the DVE by sequentially performing the second subset of ordered steps, wherein executing the second portion of the DVE causes the computing system to generate a second portion of the video content at a second frame rate that is different than the first frame rate.

2. The method of claim 1, wherein the computing system is a video system comprising (i) a video-production system (VPS) and (ii) a video-broadcast system (VBS).

3. The method of claim 1, wherein the computing system is a DVE system.

4. The method of claim 1, further comprising:
   from among the generated first portion of the video content and the generated second portion of the video content, integrating, by the computing system, only the generated second portion of the video content into a video program.

5. The method of claim 1, wherein the first frame rate is greater than the second frame rate.

6. The method of claim 1, wherein receiving the second command comprises receiving the second command via a user interface.

7. The method of claim 1, wherein receiving the second command comprises receiving the second command from a sequencing system.

8. A non-transitory computer-readable medium having stored thereon program instructions that upon execution by a processor, cause performance of a set of acts for use in connection with a computing system configured to execute a digital-video effect (DVE) by sequentially performing a set of ordered steps, wherein executing the DVE causes the computing system to generate video content, wherein the set of ordered steps comprises a first subset of ordered steps followed by a second subset of ordered steps, the set of acts comprising:
   receiving, by the computing system, a first command;
   responsive to receiving the first command, executing, by the computing system, a first portion of the DVE by sequentially performing the first subset of ordered steps, wherein executing the first portion of the DVE causes the computing system to generate a first portion of the video content at a first frame rate;
   receiving, by the computing system, a second command; and
   responsive to receiving the second command, executing, by the computing system, a second portion of the DVE by sequentially performing the second subset of ordered steps, wherein executing the second portion of the DVE causes the computing system to generate a second portion of the video content at a second frame rate that is different than the first frame rate.

9. The non-transitory computer-readable medium of claim 8, wherein the computing system is a video system comprising (i) a video-production system (VPS) and (ii) a video-broadcast system (VBS).

10. The non-transitory computer-readable medium of claim 8, wherein the computing system is a DVE system.

11. The non-transitory computer-readable medium of claim 8, the set of acts further comprising:
    from among the generated first portion of the video content and the generated second portion of the video content, integrating, by the computing system, only the generated second portion of the video content into a video program.

12. The non-transitory computer-readable medium of claim 8, wherein the first frame rate is greater than the second frame rate.

13. The non-transitory computer-readable medium of claim 8, wherein receiving the second command comprises receiving the second command via a user interface.

14. The non-transitory computer-readable medium of claim 8, wherein receiving the second command comprises receiving the second command from a sequencing system.

15. A computing system configured for (i) use in connection with a computing system configured to execute a digital-video effect (DVE) by sequentially performing a set of ordered steps, wherein executing the DVE causes the computing system to generate video content, wherein the set of ordered steps comprises a first subset of ordered steps followed by a second subset of ordered steps, and (ii) performing a set of acts comprising:
   receiving, by the computing system, a first command;
   responsive to receiving the first command, executing, by the computing system, a first portion of the DVE by sequentially performing the first subset of ordered steps, wherein executing the first portion of the DVE causes the computing system to generate a first portion of the video content at a first frame rate;
   receiving, by the computing system, a second command; and
   responsive to receiving the second command, executing, by the computing system, a second portion of the DVE by sequentially performing the second subset of ordered steps, wherein executing the second portion of the DVE causes the computing system to generate a second portion of the video content at a second frame rate that is different than the first frame rate.

16. The computing system of claim 15, wherein the computing system is a video system comprising (i) a video-production system (VPS) and (ii) a video-broadcast system (VB S).

17. The computing system of claim 15, wherein the computing system is a DVE system.

18. The computing system of claim 15, the set of acts further comprising:
   from among the generated first portion of the video content and the generated second portion of the video content, integrating, by the computing system, only the generated second portion of the video content into a video program.

19. The computing system of claim 15, wherein the first frame rate is greater than the second frame rate.

20. The computing system of claim 15, wherein receiving the second command comprises receiving the second command via a user interface.

* * * * *